United States Patent
Huteaux

(10) Patent No.: US 9,576,182 B2
(45) Date of Patent: Feb. 21, 2017

(54) METHOD FOR AUTHENTICATING A SIGNATURE

(71) Applicant: Compagnie Industrielle et Financiere D'Ingenierie "Ingenico", Paris (FR)

(72) Inventor: Fabien Huteaux, Boulogne-Billancourt (FR)

(73) Assignee: INGENICO GROUP, Paris (FR)

( * ) Notice: Subject to any disclaimer, the term of this patent is extended or adjusted under 35 U.S.C. 154(b) by 8 days.

(21) Appl. No.: 13/935,133

(22) Filed: Jul. 3, 2013

(65) Prior Publication Data

US 2014/0010420 A1 Jan. 9, 2014

(30) Foreign Application Priority Data

Jul. 6, 2012 (FR) ...................................... 12 56553

(51) Int. Cl.
*G06K 9/00* (2006.01)
(52) U.S. Cl.
CPC .................................. *G06K 9/00167* (2013.01)
(58) Field of Classification Search
None
See application file for complete search history.

(56) References Cited

U.S. PATENT DOCUMENTS

| | | | | |
|---|---|---|---|---|
| 6,160,914 A * | 12/2000 | Muroya | ............. | G06K 9/00154 382/120 |
| 6,307,956 B1 * | 10/2001 | Black | ............... | 382/124 |
| 7,034,802 B1 * | 4/2006 | Gettemy | ............... | G06F 1/1626 345/156 |
| 8,660,978 B2 * | 2/2014 | Hinckley | ................ | G06F 3/038 706/52 |
| 8,866,497 B2 * | 10/2014 | Caldwell | ............... | G06F 3/0418 324/658 |
| 9,004,353 B1 * | 4/2015 | Block | ................ | G06Q 20/1085 235/379 |
| 2001/0056410 A1 * | 12/2001 | Ishigaki | ................. | G06Q 20/04 705/67 |
| 2002/0025062 A1 * | 2/2002 | Black | ............................. | 382/116 |
| 2003/0138135 A1 * | 7/2003 | Chung et al. | .................. | 382/119 |
| 2005/0180618 A1 * | 8/2005 | Black | ............................ | 382/124 |

(Continued)

OTHER PUBLICATIONS

Kekre et al.: "Garbor Filter Based Feature Vector for Dynamic Signature Recognition," International Journal of Computer Applications (0975-8887), vol. 2, No. 3, May 2010, pp. 74-80.

(Continued)

*Primary Examiner* — Jason Heidemann
(74) *Attorney, Agent, or Firm* — David D. Brush; Westman, Champlin & Koehler, P.A.

(57) ABSTRACT

A method is provided for recording a user's handwritten signature through a device including a touch-sensitive surface. The method includes a phase of obtaining a handwritten signature, which includes at least one step of acquiring the handwritten signature on the touch-sensitive surface of the device, delivering an acquired signature and at least one step of recording the acquired signature within a signature-recording space. During the phase of obtaining the handwritten signature, the method includes at least one step of measuring at least one piece of complementary data through the device and at least one step of recording the at least one piece of complementary data.

15 Claims, 2 Drawing Sheets

(56) References Cited

U.S. PATENT DOCUMENTS

Figure 1:
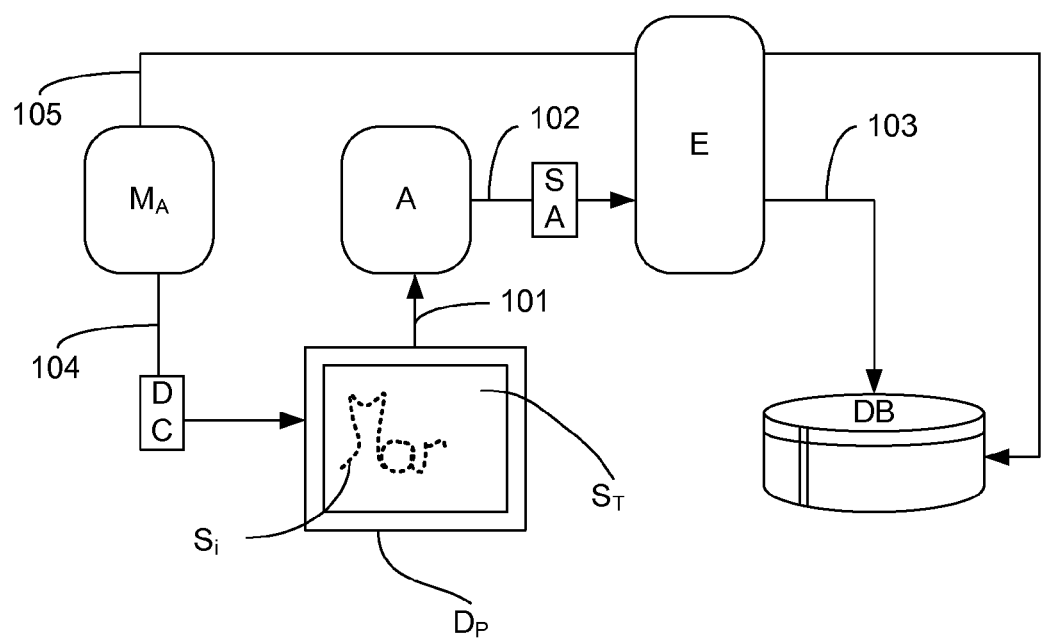

| | | | |
|---|---|---|---|
| 2006/0159344 A1* | 7/2006 | Shao | G06F 3/0346 |
| | | | 382/186 |
| 2006/0215886 A1* | 9/2006 | Black | 382/124 |
| 2007/0024590 A1 | 2/2007 | Krepec | |
| 2007/0130547 A1* | 6/2007 | Boillot | G06F 3/017 |
| | | | 715/863 |
| 2008/0091453 A1* | 4/2008 | Meehan | G06Q 20/341 |
| | | | 705/317 |
| 2008/0106520 A1* | 5/2008 | Free | G06F 3/03545 |
| | | | 345/173 |
| 2012/0013569 A1* | 1/2012 | Swedin | G02F 1/13338 |
| | | | 345/174 |
| 2012/0174213 A1 | 7/2012 | Geiger et al. | |
| 2012/0207393 A1* | 8/2012 | Huteaux et al. | 382/186 |
| 2013/0106725 A1* | 5/2013 | Bakken | G06F 3/033 |
| | | | 345/173 |
| 2013/0229361 A1* | 9/2013 | Brown | G06F 3/0488 |
| | | | 345/173 |

OTHER PUBLICATIONS

Monwar et al.: "Multimodal Biometric System Using Rank-Level Fusion Approach," IEEE Transactions on Systems, Man, and Cybernetics, Part B: Cybernetics, vol. 39, No. 4, Aug. 2009, pp. 867-878.
French Search Report and Written Opinion dated May 21, 2013 for related French Patent Application No. 1256553, filed Jul. 6, 2012.

* cited by examiner

METHOD FOR AUTHENTICATING A SIGNATURE

1. FIELD OF THE INVENTION

The invention pertains to the field of authentication. More particularly, the invention pertains to the field of the authentication of a user by means of a handwritten signature.

2. PRIOR ART

There are known devices in the prior art that enable a user to enter data on a touch-sensitive surface. Such devices are used for example to validate the reception of packages delivered by transporters. Such devices are also used to validate an electronic transaction during payment using a payment terminal with a touch-sensitive screen on which a user can put a signature in order to validate the transaction. This transaction can also be made by means of a bank card. In this case, the signature is a guarantee provided for the transaction. The user in this case can be the owner or holder of the payment card.

The authentication of the cardholder consists in verifying that the user of the card is the owner or authorized user of this card. Not all applications require that the identity of the owners should be verified. For example, the presentation of a smart card containing a ticket or a valid authorization is usually sufficient to enable travel on public transport services. When it is important to know who the user is (as in the case of financial use or a certification of identity), the verification of the cardholder is normally required.

The classic method used to authenticate a cardholder is to compare the signature on the payment slip with the signature on the back of the card. Another classic method is to ask for a four-digit personal identification number (PIN). Customers often find it difficult to recollect the numerous PIN codes associated with their cards (especially if they are rarely used) and are therefore inclined to write these numbers down, and this diminishes the security of the system. People affected by dyslexia can have problems in remembering the digits in the right order.

Many biometric systems have been developed to improve the security of the authentication of the cardholder. These include fingerprinting, corneal recognition and face recognition. These methods however can be seen as inappropriate, depending on the situations in which they are used.

Thus, as a replacement for these methods which can be ill-received, methods related to authentication of the signature of the holder, the customer or simply the user, have made an appearance. These signature-authenticating methods are based on the recognition of the signature with reference to a pre-recorded model. Such methods are either static or dynamic. Static methods were the first to be developed. Static methods are based on a comparison of points, deemed to be significant points of the signature produced by the signing party or signer, with points of the model signature that are stored in a database. When the significant points and the stored points are consistent with each other, the signature is deemed to be the right one, and the signer is identified and/or authenticated. It can be understood that such static methods are unsure because they allow a signer who has achieved sufficient mastery of the forging of significant points of the signature to imitate the signature and be identified and/or authenticated as a legitimate user or cardholder.

Dynamic methods complement static methods by dynamic analysis of handwriting, i.e. by a dynamic analysis of the progress of the writing of the signature on the support. In other words, the analysis is time-related and the points of comparison are spread over time. Thus, it is not only the final result that is verified as in the case of static methods but also the way in which the signature is done. To this end, the pre-recorded model also takes account of the speed and the coordinates of the signature in time. Other methods also take account of the pressure exerted on the stylus during the signing process so as to benefit from an additional piece of comparison data in the database.

With these techniques of dynamic recognition, it is more difficult for the signer to forge a user's signature. However, this is still possible because, on the one hand, writing with a stylus on a touch-sensitive surface does not make it possible to obtain a constant signature. This means that a legitimate user's signature is likely to vary greatly according to the conditions in which the signing is done. The conditions likely to affect the quality of the signature include, for example the position in which the signing is done, the quality of the touch-sensitive screen, the quality of the stylus, etc.

Thus to be able all the same to recognize the signature, practical applications of static or dynamic methods require the use of ranges of values deemed to be suitable. Now these ranges of values in themselves introduce a problem of security since they enable a signer, with sufficient mastery of the signature of the user whose identity he wishes to assume, to be recognized as a legitimate user. Thus, it is not certain, even with known methods, that the signature of the signer will be truly that of the user who is to be identified.

3. SUMMARY OF THE INVENTION

The invention makes it possible, at least in part, to overcome this drawback of the prior art. Indeed, the invention pertains to a method for recording a user's handwritten signature through a device comprising a touch-sensitive surface, said method comprising a phase for obtaining a handwritten signature comprising at least one step for acquiring said handwritten signature on said touch-sensitive surface of said device delivering an acquired signature and at least one step for recording said acquired signature within a signature-recording space.

According to the invention, said method further comprises, during said phase for obtaining said handwritten signature, at least one step for measuring at least one piece of complementary data through said device and at least one step for recording said at least one piece of complementary data.

Thus, during one and the same phase for obtaining a handwritten signature, the invention makes it possible to complement the data acquired and thus, subsequently, to have available complementary data, on the basis of which a complementary comparison can be made to authenticate or not authenticate the user's signature. It is important to note that it is during the recording phase that the pieces of complementary data are acquired. The technique described does not require the implementing of a new phase for capturing complementary data that is dissociated from the recording of the signature. The technique described is therefore simpler to learn from the viewpoint of the user/signer.

According to one particular characteristic, said step for measuring is implemented prior to said step for acquiring said handwritten signature. Thus, it is possible to measure physical parameters or variables delivering complementary data without interfering with the recording process. The pieces of complementary data are obtained prior to the acquisition.

According to one particular characteristic, said step for measuring is implemented periodically during said step for acquiring said handwritten signature. Thus it is possible to make several measurements of physical parameters delivering complementary data. In this case, it is possible to interrupt the recording step temporarily. The pieces of complementary data are obtained along with the acquisition. According to one particular characteristic, when two different modules are implemented to measure and acquire a signature, it is not necessary to interrupt one module in order to implement the other.

According to one particular characteristic, said step further comprises, prior to said step for measuring, a step for activating a module for measuring said piece of complementary data and, subsequently to said step for measuring, a step for deactivating said module for measuring said piece of complementary data.

Thus, the complementary data is measured on a case-by-case basis and the module that is used to do this is not liable to be hacked and/or misused, for example, for the purpose of taking control of the device.

According to one particular embodiment, said module for measuring said piece of complementary data is said touch-sensitive surface and said step for activating comprises a step for modifying a value of capacitive sensitivity of said touch-sensitive surface and said step for deactivating said module for measuring comprises a step for restoring the value of capacitive sensitivity of said touch-sensitive surface.

Thus, it is not necessary to provide for modules other than those that already exist. Besides, when the sensitivity of the touch-sensitive pad is being raised, the recording of the signature can proceed. Furthermore, in this embodiment, it is impossible to hack into or make inappropriate use of the module.

The invention also pertains to a method for authenticating a user's handwritten signature through a device comprising a touch-sensitive surface, said method comprising a phase for obtaining a handwritten signature comprising at least one step for acquiring said handwritten signature on said touch-sensitive surface of said device delivering an acquired signature and at least one step for comparing said acquired signature with a signature recorded within a signature-recording space.

According to the invention, said method further comprises, during said step for obtaining said handwritten signature, at least one step for measuring at least one piece of complementary data through said device and at least one step for comparing said at least one piece of complementary data with at least one corresponding piece of complementary data associated with said signature recorded within said signature-recording space.

The invention also pertains to a device for recording a user's handwritten signature through a device comprising a touch-sensitive surface, said recording device comprising means for obtaining a handwritten signature comprising means for acquiring said handwritten signature on said touch-sensitive surface of said device delivering an acquired signature and means for recording said acquired signature within a signature-recording space.

According to the invention, said device further comprises means for measuring at least one piece of complementary data through said recording device and means for recording said at least one piece of complementary data.

The invention also pertains to a device for authenticating a user's handwritten signature through a device comprising a touch-sensitive surface, said device comprising means for obtaining a handwritten signature comprising means for acquiring said handwritten signature on said touch-sensitive surface of said device delivering an acquired signature and means for comparing said acquired signature with a signature recorded within a signature-recording space.

According to the invention, said device further comprises means for measuring at least one piece of complementary data through said device and means for comparing said at least one piece of complementary data with at least one corresponding piece of complementary data associated with said signature recorded within said signature-recording space.

The invention also pertains to a computer program product downloadable from a communications network and/or stored on a computer-readable medium and/or executable by a microprocessor.

According to the invention, such a program comprises program code instructions for executing the method for recording and/or the method for authenticating as presented here above.

The invention also pertains to an information medium readable by a data processor and comprising instructions of a computer program as mentioned here above.

4. DRAWINGS

Figure 3:
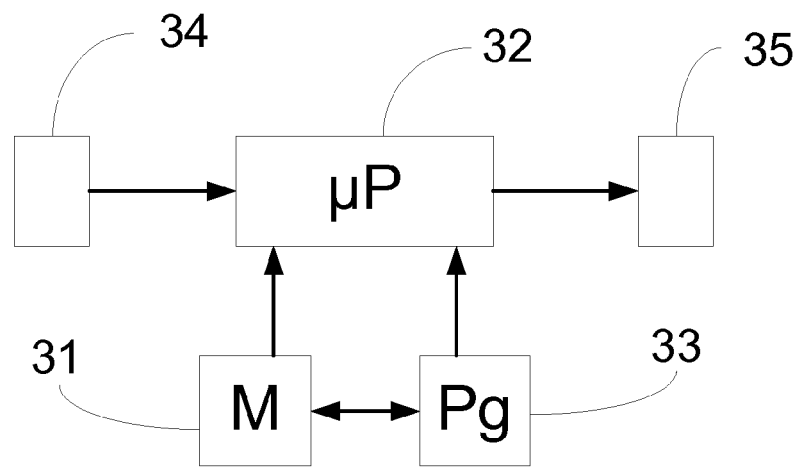
Figure 2:
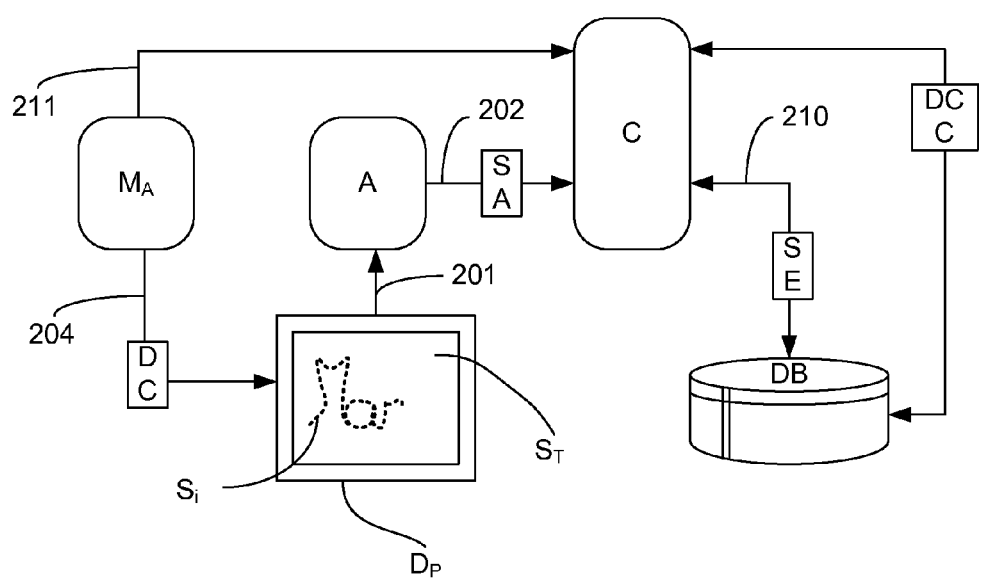

Other features and advantages of the present invention shall appear more clearly from the following description of a preferred embodiment, given by way of a simple, illustratory and non-exhaustive example and from the appended drawings, of which:

FIG. 1 describes the steps of the method for recording a signature according to one embodiment;

FIG. 2 describes the steps of the method for authenticating a signature according to one embodiment;

FIG. 3 illustrates a step for recording and authenticating a signature according to one embodiment.

5. DESCRIPTION

5.1. Reminder

As explained here above, the invention adds a new piece of characteristic data to the dynamic signature model.

More particularly, in addition to the time and classic signature entry coordinates (x-axis and y-axis), the method that is the object of the present disclosure takes account of novel pieces of data which, without directly coming from the signature, are nevertheless related to it by a link of connectivity directly derived from the user himself.

In one particular embodiment, the pieces of data are pieces of complementary positioning data measured through the touch-sensitive pad on which the signature is made. These additional pieces of data, according to the embodiments envisaged, do not directly play a part in the authentication of the signature but are taken into account on a complementary basis to decide on validation or non-validation of a litigious signature. The term "litigious signature" is understood to mean a signature concerning which there is uncertainty as to its authenticity. In this case, the pieces of complementary data acquired through the touch-sensitive screen can be used to decide on whether or not to accept the signature. In other embodiments, these pieces of complementary data are, on the contrary, preponderant for the authentication of the signature.

In other words, the invention can be used to validate or not validate a litigious signature using pieces of complementary data obtained through a sensor (such as the touch-sensitive screen) of the device on which the signature is made.

The invention comprises two distinct aspects:
the first aspect pertains to the acquisition of complementary data. This acquisition is done at the same time as the acquisition of the initial signature. According to the invention, the acquisition procedure comprises the acquisition, in addition to classic data, of complementary data. Depending on the embodiment, the pieces of complementary data can be either directly included in a database or pre-processed during the acquisition, and it is the result of this pre-processing operation that is inserted into a database.
the second aspect pertains to the comparison of a signature made by a signer with a recorded signature in order to identify or authenticate a user. According to the invention, the method for comparing the signature with a recorded signature comprises a step for comparing pieces of entered complementary data with pieces of complementary data recorded in a database. This comparison between complementary data can be done as a matter of choice. Depending on the nature of this data and on the embodiments, this comparison will be preponderant or secondary as regards the authentication of the signer. In other words, either the pieces of complementary data make it possible to take a decision on a doubtful or litigious signature (in this case the complementary data comes into play at a second level) or the pieces of complementary data are used to categorize a signature prior to its recognition (in this case the pieces of complementary data come into play at a first level).

More particularly, referring to FIG. 1, an embodiment is presented of the method for recording a signature.

In this embodiment, the method for recording a user's handwritten signature through a device (DP) comprising a touch-sensitive surface (ST) comprises a phase for obtaining a handwritten signature (SI) comprising at least one step for acquiring (101) said handwritten signature on said touch-sensitive surface (ST) of said device (DP) delivering (102) an acquired signature (SA) and at least one step for recording (103) said acquired signature (SA) within a signature-recording space (DB). The method further comprises, during the phase for obtaining said handwritten signature, at least one step (104) for measuring at least one piece of complementary data (DC) through said device (DP) and one step for recording (105) said complementary data (DC) within said signature-recording space (DB). The step for acquiring (101) the signature is implemented through an acquisition module (A). The step for delivering (102) the acquired signature is also implemented by the acquisition module (A). The acquired signature (SA) can be the result of an optimization or a mathematical transformation which is performed by the acquisition module (A). The steps for recording (103, 105) are implemented by a recording module (E). This recording module (E) can or cannot be integrated into the acquisition module (A).

The step for measuring (104) is, for its part, implemented through a measuring module (MA) which is also integrated into the acquisition module (A) depending on the embodiments. This measuring module (MA), as presented here below, can be the touch-sensitive surface (ST) itself. In this case, the measuring module and the acquisition module are one and the same module. In other embodiments, the measuring module (A) may be a CCD sensor, an infrared sensor, etc. When the measuring module (MA) is a CCD sensor, the complementary data may take the form of sensor images making it possible to verify the speed at which the hand is moving. In another embodiment of the invention, several measuring modules (MA) can be used. For example, several CCD sensors (one on top, one to the left, one below and one to the right) can be arranged around the touch-sensitive surface (ST) in order to measure the differential motion of the hand relative to the sensors. The pieces of complementary data recorded in the database are then relative speeds of movement of the hand.

Referring to FIG. 2, an embodiment is presented of the signature authentication method.

In this embodiment, the method for recording a user's handwritten signature through a device (DP) comprising a touch-sensitive surface (ST) comprises a phase for obtaining a handwritten signature (SI) comprising at least one step of acquisition (201) of said handwritten signature on said touch-sensitive surface (ST) of said device (DP) delivering (202) an acquired signature (SA) and at least one step for comparing (210) said acquired signature (SA) with a signature recorded (SE) within a signature-recording space (DB). In this embodiment, the method further comprises, during said phase for obtaining said handwritten signature, at least one step (204) for measuring at least one piece of complementary data (DC) through said device (DP) and at least one step (211) for measuring said at least one piece of complementary data (DC) with at least one piece of corresponding complementary data (DCc) associated with said signature recorded (SE) within said signature-recording space (DB).

The modules that make it possible to implement this method are the same as those described here above, except for the comparison module (C). This comparison module is used to compare the data received from the acquisition and measurement modules and to deliver or not deliver an assertion of validity of the signature depending on the comparisons made. The other modules are not described in further detail here.

Here below, we present an embodiment of the technique described, in which the pieces of complementary data relate to the positioning of the hand of the signer on the touch-sensitive surface at the time of the signing. It is understood that the embodiment is given purely by way of an illustration of the principle of the invention and cannot be taken as restricting the scope of the invention.

5.2. Description of One Embodiment

In this embodiment, the touch-sensitive pad of the touch-sensitive screen on which the signing is done is used to obtain pieces of complementary data on the signature. In this embodiment, the recording device and the authentication device are one and the same device. This is also the case in most instances for reasons of practicality and cost. Thus, in this embodiment, the module for measuring said piece of complementary data is the touch-sensitive surface itself. The inventors have noted in carrying out trials that, in special conditions, the capacitive touch-sensitive screens or pads enable detection of non-neutral objects (having relatively high conductivity such as a hand, the tip of a stylus etc) in an area proximate to the pad or the screen, i.e. before these objects have reached the surface of the touch-sensitive screen or the pad. This detection is also possible when the object in question has reached the touch-sensitive surface and is in contact with it.

It is therefore possible, through capture at the beginning or at regular intervals, during the writing of the signature, to measure the contribution for example of the hand of the user wishing to sign on the touch-sensitive screen.

According to one particular characteristic, this step for measuring the signer's contribution is done after a step for raising the sensitivity of the screen of the touch-sensitive surface. According to one particular characteristic, subsequent to said step for measuring, the method comprises a step for restoring the sensitivity to an initial value. Thus, the raising of the sensitivity is applied temporarily.

The measurement performed makes it possible to obtain a piece of information on the location of the hand on the touch-sensitive pad (or surface). In this embodiment, this piece of information, which is relatively imprecise, is not aimed at locating the user's hand or its movement with precision but makes it possible to determine the way in which the user is holding his pen (whether he is left-handed or right-handed) and, with even greater precision, the trigonometrical position of his hand around the axis of the pen.

Concretely, in this embodiment, it is thus possible to find out which is the hand used to write the signature. It can thus be understood for example that if the signature is written with the right hand whereas the user to be authenticated is left-handed, it is highly probable that the signer is not the user to be authenticated. The converse is also true (signing by a left-handed person whereas the user to be authenticated is right-handed). Thus, this piece of complementary data obtained through this embodiment makes it possible to identify signing parties who are committing forgery.

According to one particular characteristic, it is also possible to indirectly deduce the size of the user's hand by means of the capacitive touch-sensitive screen which measures the projection of the surface of the hand before the screen. It is then enough to choose the time of the signing (for example the first contact between the stylus and the pad) to make this measurement.

During the phase of recognition or authentication, it is then possible to compare the size and position of the hand with the previously recorded position.

FIG. 3 illustrates a simplified structure of a device for recording an authentication according to one embodiment of the invention. For example, the recording and authentication device includes a memory 31 consisting of a buffer memory, a processing unit 32, equipped for example with a microprocessor and driven by the computer program 33, implementing a method for recording on the one hand and method for authenticating on the other hand.

At initialization, the code instructions of the computer program 33 are for example loaded into a memory and then executed by the processor of the processing unit 32. The processing unit 32 inputs at least one piece of data representing a signature on the one hand and a piece of complementary data on the other hand. The microprocessor of the processing unit 32 implements the steps of method for recording and/or authenticating according to the instructions of the computer program 33, either to record a signature to be recognized later or to authenticate an already recorded signature.

To this end, the device comprises the following in addition to the buffer memory 31:
  means of acquisition and measurement 34 which are described here above in the form of modules;
  means for recording;
  means of comparison.

These means are driven by the microprocessor of the processing unit 32 to provide either a signature or an affirmation of authentication.

The means referred to here above are, as a matter of choice and depending on the embodiment envisaged, either integrated in the form of a specific computer program or distributed among particular electronic modules, for example dedicated circuits or processors. In one alternative embodiment, a part or all of the steps used to carry out the method for recording and/or comparison can be implemented in the form of hardware in an FPGA (Field Programmable Gate Array) type programmable component or an ASIC (Application-Specific Integrated Circuit) type component.

The invention claimed is:

1. A method for recording a user's handwritten signature through a device comprising a touch-sensitive surface, said method comprising:
  a phase of obtaining the handwritten signature comprising at least one act of acquiring said handwritten signature on said touch-sensitive surface of said device delivering an acquired signature and at least one act of recording said acquired signature within a signature-recording space;
  during said phase of obtaining said handwritten signature, at least one act of measuring at least one piece of complementary data representing a position of a hand of the user through said touch sensitive surface, said hand being used for writing said signature, wherein the complementary data represents a trigonometrical position of the hand around an axis of a stylus held by a user and used for writing the handwritten signature during the act of acquiring said handwritten signature; and
  at least one act of recording said at least one piece of complementary data.

2. The method for recording according to claim 1, wherein said act of measuring is implemented prior to said act of acquiring said handwritten signature.

3. The method for recording according to claim 1, wherein said act of measuring is implemented periodically during said act of acquiring said handwritten signature.

4. The method for recording according to claim 1, wherein the method further comprises, prior to said act of measuring, an act of activating a module for measuring said piece of complementary data and, subsequently to said act of measuring, an act of deactivating said module for measuring said piece of complementary data.

5. The method for recording according to claim 4, wherein said module for measuring said piece of complementary data comprises said touch-sensitive surface and said act of activating comprises an act of modifying a value of capacitive sensitivity of said touch-sensitive surface and said act of deactivating said module for measuring comprises an act of restoring the value of capacitive sensitivity of said touch-sensitive surface.

6. The method according to claim 1, wherein said measuring is performed at regular intervals during said phase of obtaining said handwritten signature.

7. The method according to claim 1, wherein said at least one piece of data represents also a projection area of said hand of the user on said touch-sensitive surface.

8. A method for authenticating a user's handwritten signature through a device comprising a touch-sensitive surface, said method comprising:
  a phase of obtaining a handwritten signature comprising at least one act of acquiring said handwritten signature on said touch-sensitive surface of said device delivering an acquired signature and at least one act of comparing said acquired signature with a signature recorded within a signature-recording space;

during said act of obtaining said handwritten signature, at least one act of measuring at least one piece of complementary data representing a position of a hand of the user through said touch sensitive surface, said hand being used for writing said signature, wherein the complementary data represents a trigonometrical position of the hand around an axis of a stylus held by a user and used for writing the handwritten signature during the act of acquiring said handwritten signature; and at least one act of comparing said at least one piece of complementary data with at least one corresponding piece of complementary data associated with said signature recorded within said signature-recording space.

9. The method according to claim 8, further comprising:
recording the user's handwritten signature through the device, wherein recording comprises:
an initial phase of obtaining an initial handwritten signature comprising at least one act of acquiring said initial handwritten signature on said touch-sensitive surface of said device delivering an initial acquired signature and at least one act of recording said initial acquired signature within the signature-recording space;

during said initial phase of obtaining said initial handwritten signature, at least one act of measuring at least one initial piece of complementary data representing the position of the hand of the user through said touch sensitive, said hand being used for writing said initial handwritten signature; and at least one act of recording said at least one initial piece of complementary data.

10. The method for recording according to claim 9, wherein said act of measuring at least one initial piece of complementary data is implemented prior to said act of acquiring said initial handwritten signature.

11. The method for recording according to claim 9, wherein said act of measuring at least one initial piece of complementary data is implemented periodically during said act of acquiring said initial handwritten signature.

12. The method for recording according to claim 9, wherein the method further comprises, prior to said act of measuring at least one initial piece of complementary data, an act of activating a module for measuring said initial piece of complementary data and, subsequently to said act of measuring at least one initial piece of complementary data, an act of deactivating said module for measuring said initial piece of complementary data.

13. The method for recording according to claim 12, wherein said module for measuring said initial piece of complementary data comprises said touch-sensitive surface and said act of activating comprises an act of modifying a value of capacitive sensitivity of said touch-sensitive surface and said act of deactivating said module for measuring comprises an act of restoring the value of capacitive sensitivity of said touch-sensitive surface.

14. A device for authenticating a user's handwritten signature, said device comprising:
a touch-sensitive surface;
means for acquiring said handwritten signature on said touch-sensitive surface of said device, delivering an acquired signature;
means for comparing said acquired signature with a signature recorded within a signature-recording space;
means for measuring at least one piece of complementary data representing a position of a hand of the user through said touch sensitive surface, said hand being used for writing said signature, wherein the complementary data represents a trigonometrical position of the hand around an axis of a stylus held by a user and used for writing the handwritten signature during the acquiring of said handwritten signature; and
means for comparing said at least one piece of complementary data with at least one corresponding piece of complementary data associated with said signature recorded within said signature-recording space.

15. A non-transitory computer-readable medium comprising a computer program product stored thereon and executable by a microprocessor, wherein the program product comprises program code instructions for executing A method for authenticating a user's handwritten signature through a device comprising a touch-sensitive surface, when the instructions are executed on a computer by the microprocessor, said method comprising:
a phase of obtaining a handwritten signature comprising at least one act of acquiring said handwritten signature on said touch-sensitive surface of said device delivering an acquired signature and at least one act of comparing said acquired signature with a signature recorded within a signature-recording space;

during said act of obtaining said handwritten signature, at least one act of measuring at least one piece of complementary data representing a position of a hand of the user through said touch sensitive surface, said hand being used for writing said signature, wherein the complementary data represents a trigonometrical position of the hand around an axis of a stylus held by a user and used for writing the handwritten signature during the act of acquiring said handwritten signature; and at least one act of comparing said at least one piece of complementary data with at least one corresponding piece of complementary data associated with said signature recorded within said signature-recording space, said at least one piece of complementary data, without directly coming from the signature, being related to the signature by a link of connectivity directly derived from the user.

* * * * *